United States Patent [19]

Simpkins et al.

[11] 3,736,594
[45] May 29, 1973

[54] FACSIMILE RECORDING DRUM ELECTRODE

[75] Inventors: Frederick W. Simpkins, Hudson; Ernest Bliudnikas, Brockton, both of Mass.

[73] Assignee: Alden Research Foundation, Westboro, Mass.

[22] Filed: Nov. 22, 1971

[21] Appl. No.: 200,678

Related U.S. Application Data

[63] Continuation-in-part of Ser. No. 130,111, April 1, 1971, abandoned.

[52] U.S. Cl. ........................... 346/139 C, 346/101
[51] Int. Cl. .................................. G01d 15/06
[58] Field of Search ............. 346/101, 139 C, 139 R, 346/74 E, 74 CH; 178/6.6 R

[56] References Cited

UNITED STATES PATENTS

| 2,568,754 | 9/1951 | Lupish | 346/101 |
| 2,580,464 | 1/1952 | Rohrberg | 346/101 |
| 2,591,640 | 4/1952 | Tribble | 346/101 |
| 2,597,199 | 5/1952 | Stamper et al. | 346/114 X |
| 2,962,340 | 11/1960 | Alden | 346/101 |
| 3,491,365 | 1/1970 | Desautels | 346/101 X |
| 3,577,150 | 5/1971 | Alden | 346/101 X |

*Primary Examiner*—Joseph W. Hartary
*Attorney*—James H. Grover

[57] ABSTRACT

A partially folded strip electrode of electrically conducting sheet material is held curved around a drum by a coiled spring, elastic strand or spring tensioned wire attached to the drum whose intermediate portion overlies and yieldingly holds the strip against the drum with one fold extending flexibly away from the drum for cooperating with a blade electrode in marking an intermediate strip of electrical recording paper.

30 Claims, 17 Drawing Figures

Patented May 29, 1973 3,736,594
2 Sheets-Sheet 1
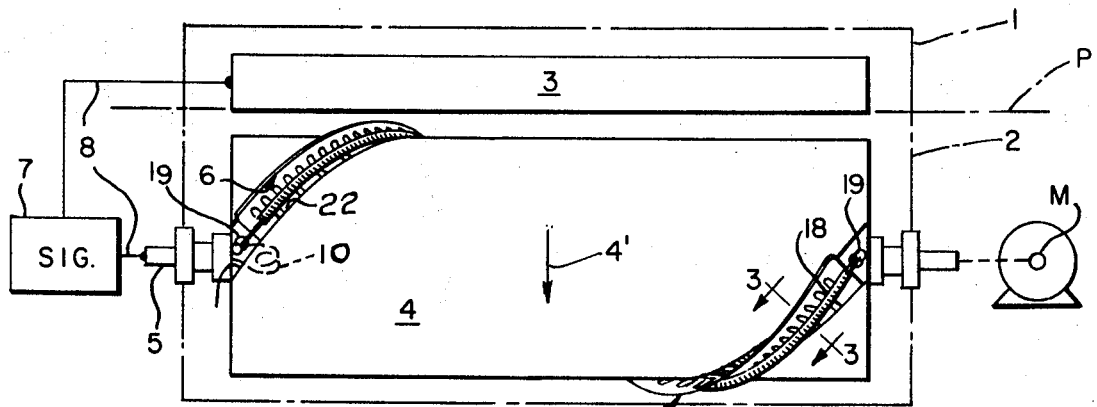
FIG. 1
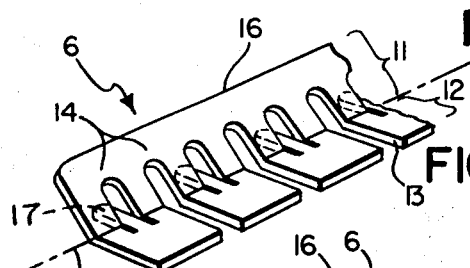
FIG. 2
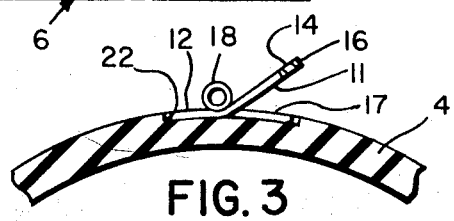
FIG. 3
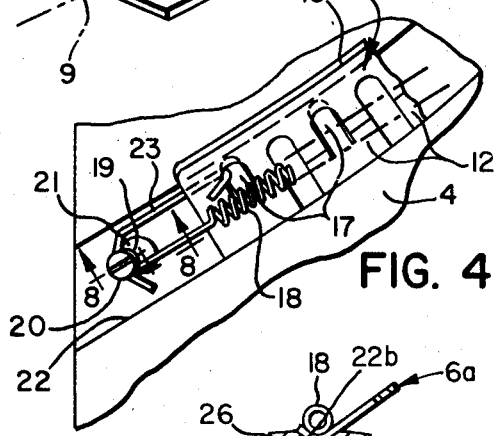
FIG. 4
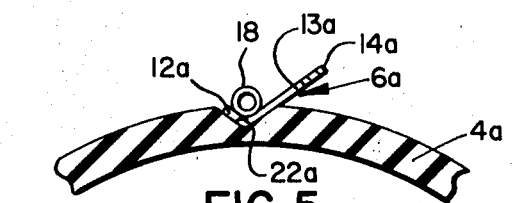
FIG. 5
FIG. 10
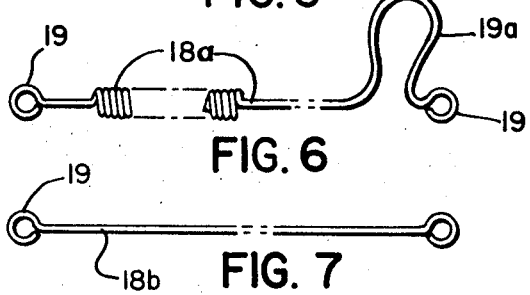
FIG. 6
FIG. 7
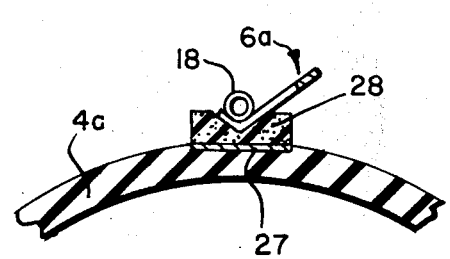
FIG. 9
FIG. 8
INVENTORS
FREDERICK W. SIMPKINS
ERNEST BLIUDNIKAS
BY
James H. Grover
ATTORNEY Patented May 29, 1973

INVENTORS
FREDERICK W. SIMPKIN
ERNEST BLIUDNIKAS
BY
James H. Grover
ATTORNEY

FACSIMILE RECORDING DRUM ELECTRODE

This application is a continuation-in-part of application Ser. No. 130,111 for Facsimile Recording Drum Electrode, filed Apr. 1, 1971, now abandoned. Reference is also made to U.S. Pat. application Ser. No. 793,132 for Recording Helix, filed Jan. 22, 1969 by Milton Alden, now U.S. Pat. No. 3,577,150.

BACKGROUND OF THE INVENTION

In the above referenced application there is disclosed an elongate recording electrode adapted to be helically wrapped around and secured to a rotating facsimile recording drum. The electrode consists of an elongate metal strip folded longitudinally to form two angularly disposed lengthwise panels the first of which is secured in a helical groove around the drum. The strip is transversely serrated to permit torsional twisting into helical shape with the second panel standing outwardly of the drum to form an outer, helical recording edge. In operation the drum is rotated opposite a linear, blade-like electrode with a moving sheet of electrolytic or other electrosensitive paper between the electrodes. As is well known in the facsimile art, rotation of the drum while facsimile signals are applied to the two electrodes causes the paper to be marked as the pressure point of the helical electrode against the linear electrode travels across the paper. In such operation the folded, serrated helical electrode of the application referred to flexes at its outer recording edge and maintains good recording contact with the paper without applying undue wearing pressure on the paper.

The object of the present invention is to provide an improved way of securing the folded helical or other curved electrode to the rotating drum or like cylindrical support, which is quick and simple, which provides a more resilient recording edge, and which increases the service life of the electrode.

SUMMARY OF THE INVENTION

According to the invention a facsimile recording scanning assembly comprises a cylindrical support, an elongate strip electrode curved around the support, an elongate holddown extending substantially the length of the strip and yieldingly bearing on the strip to urge the strip toward the support, and means for attaching the strip and holddown to the support. Preferably the support is a drum with a helical groove receiving the strip electrode and the helical electrode is a serrated strip folded to form two lengthwise panels which are allowed to rock in the groove by the holddown. Alternatively a longitudinally grooved ribbon may be secured helically on an ungrooved drum. The holddown may be a single, helical spring or other strand-like elastomer, or a relatively non-distensible wire provided with a tension spring at one or both ends. A non-yielding connection may be made between one end of the strip electrode and the drum or other cylindrical support to prevent the electrode from slipping along the groove in the drum.

DRAWINGS

For the purpose of illustration typical embodiments of the invention are shown in the accompanying drawing in which:

FIG. 1 is a front elevation of a strip electrode on a facsimile recorder drum showing other parts of the recorder schematically;

FIG. 2 is an isometric view of the strip electrode of FIG. 1;

FIG. 3 is a section on line 3—3 of FIG. 1;

FIG. 4 is an enlarged fragment of the drum;

FIG. 5 is a section like FIG. 3 showing a modified drum;

FIGS. 6 and 7 are alternate forms of strip electrode holddown;

FIG. 8 is a section on line 8—8 of FIG. 4;

FIGS. 9 and 10 are sections like FIG. 3 showing alternate forms of drum and strip electrode;

DESCRIPTION

Figure 11:
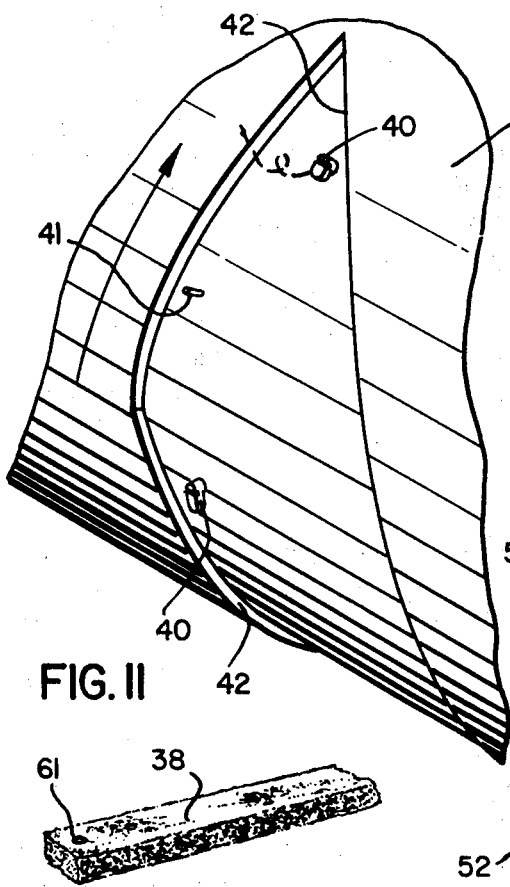
FIG. 11 is a fragmentary elevation of a further modified form of the drum of FIG. 1.
Figure 16:
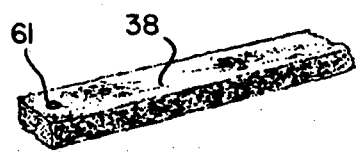
FIG. 16 is an isometric view of a foam rubber strip used with the drum of FIG. 11.
Figure 12:
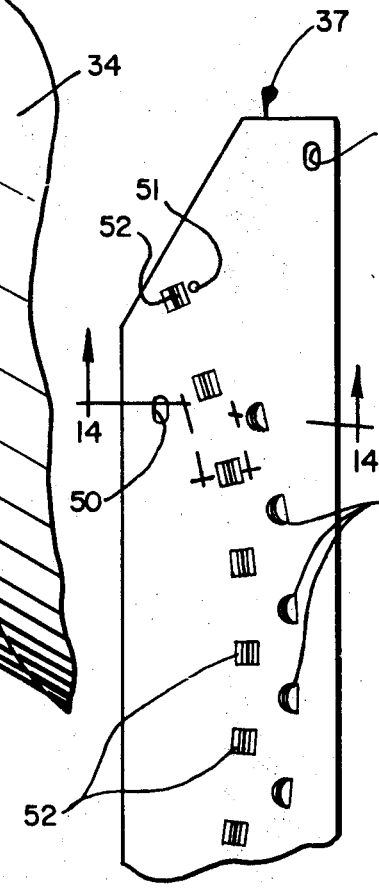
FIG. 12 is a plan view of an insert band for attachment to the drum of FIG. 11.
Figure 13:
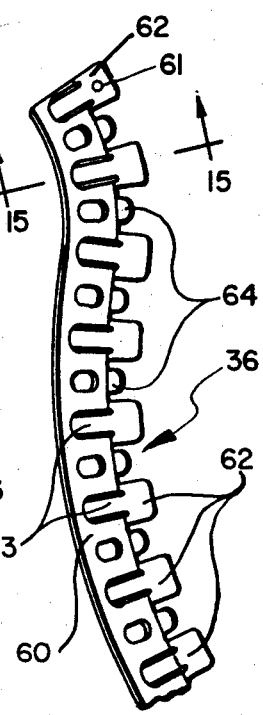
FIG. 13 is a plan view of a further form of strip electrode for attachment to the drum of FIG. 11.
Figure 14:
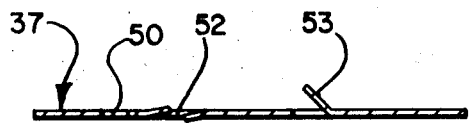
FIG. 14 is an enlarged section on line 14—14 of FIG. 12.
Figure 15:
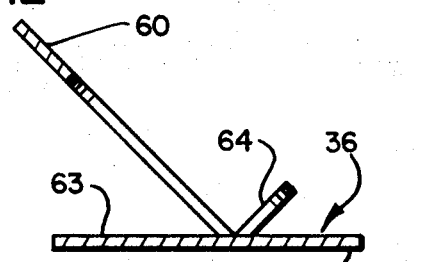
FIG. 15 is an enlarged section on line 15—15 of FIG. 13.

Shown schematically in FIG. 1 is a generally well known electrolytic recorder comprising a cover 1 hinged to a base 2. The cover 1 mounts a linear blade 3 forming one electrode. Journalled in the base is a cylindrical drum 4 of insulating material rotated during operation by a motor M. Helically curved around the drum is a second electrode 6 whose outer edge presses through a sheet of recording paper against the blade electrode 3 at a spot which travels from left to right as the drum is rotated in the direction of the arrow 4'. The sheet of electrolytic paper (not shown) is fed from a supply through a recording plane P between the blade 3 and helical electrode 6 approximately at the hinge line of the cover and base. Facsimile signals are impressed on the electrode from a source 7 through electrical connections 8 to the blade 3 and the hub 5 of the drum 4. The signals electrically mark the paper as the pressure spot between the helical electrode and blade electrode traverses the paper. During recording it is essential for uniform marking of the paper that a uniform but light and yielding pressure be maintained on the paper by flexing the helical electrode. This pressure may result in abrasion and wearing of the helical electrode and ultimate exhaustion or fracture of the electrode, limiting its life, particularly in high speed operation.

A preferred form of helical electrode 6 shown in detail in FIGS. 2 to 4 is formed of an elongate flexible strip or sheet of 0.003 to 0.005 inch thick stainless steel No. 302, half hard, or beryllium copper No. 25, half hard. The strip is partially folded lengthwise along a line 9 to form two longitudinal panels 11 and 12 at about 135°. Notches 13 are cut wholly through the base panel 12 and part way through the upstanding panel 11 leaving a more lightly flexible bridge 14 below the recording edge 16 of the electrode. Intermediate the notches, tabs 17 are cut from the upper panel 11 and left in the same plane as the base panel 12 during folding of the upstanding panel. According to the previously mentioned application Ser. No. 793,132 the tabs 17 and base panel 12 were secured on the drum by overlying strips adhered to the tabs, base panel and drum continuously along the base of the electrode 6 allowing only the upper panel 11 to flex and restricting the flexing to a short length of the upper panel near the pressure spot.

In FIG. 1 to 4 of the present application the helical strip electrode 6 is shown secured to the drum 4 by a coiled tension holddown spring 18. For an 11 inch length drum the holddown spring is approximately 12 inches long, formed of 0.020 inch steel spring wire coiled to an outer diameter of one-eighth inch. Generally the spring holddown is approximately the length of the drum and is stretched on attachment to the drum. Eyelets 19 formed at each end of the holddown spring are hooked over a screw head 20 at each end of the drum (FIGS. 4 and 8). The screw head 20 is eccentrically disposed off the axis of its shank 21 which is threaded radially into the drum 4. To attach the spring eyelets the screw heads are turned 180° from the position shown in FIG. 4, and after the eyelet is hooked the screw heads are returned to the position shown applying added tension to the spring and locking the eyelets under the eccentric head. As shown in FIG. 1 an electrical connection 10 is made inside the drum between the screw head 20 and its axle 5, to complete the circuit between the facsimile signal source 7 and the helical electrode 6.

The drum is provided with a helical groove 22 of rectangular cross section which receives the base panel 12 and tab 17 of the electrode strip 6, the edges of the groove inhibiting lateral shift of the strip. The electrode strip is held in the groove only by the spring holddown, and to prevent shifting of the electrode along the groove a short length of wire 23 is hooked in a notch of the strip and twisted around the eccentric screw head 20. Oddly, the trailing end of the electrode strip must be anchored, that is, the right hand end in FIG. 1, the end last to oppose the blade 3 in each scanning revolution.

With the spring holddown 18 of FIGS. 1 to 4 the electrode strip 6 is held accurately in helical form and applies adequate yielding pressure on the recording paper during operation. The holddown spring seats at the fold of the strip and allows the strip to rock generally about the fold line 9, with both the tab 17 and the base panel 12 flexing. In addition to this lateral rocking the spring holddown allows a longitudinal rocking or flexing of the segments of the strip between the bridges 14 at the ends of the notches 13. Flexure is thus distributed over a considerable length of the strips and involves all parts of the strip in a wave moving along the strip so that stress is not placed on a localized portion of the edge 16 opposite the blade electrode and localized metal fatigue is avoided. Additionally, longitudinal distension of the coiled spring holddown occurring during flexure of the strip results in rubbing of the holddown on the strip and maintenance of a good electrical contact between a considerable length of the holddown and strip.

Consequently the occurrence of local fractures is greatly reduced. The life of the helical electrode has been extended as much as ten times the normal expectancy at the high speed of 1,800 rpm. The spring holddown allows the electrode strip to seat in and conform to the drum groove during testing or the first few hours of operation, resulting in very uniform pressure across the recording paper. Installation or replacement of the strip electrode or the holddown spring is extremely rapid and easy.

The same advantages are present in a modified structure shown in FIG. 5 wherein a V-shaped groove 22a is cut helically in a drum 4a. An electrode strip 16a has base segments 12a, notches 13a and bridges 14a, like the strip 6 of FIGS. 1 to 4, but lacks the tabs 17. The same holddown spring 18 secures the strip in the groove 22a while allowing all portions of the strip to rock and flex laterally and longitudinally. With either form of strip electrode the spring holddown 1, coiled throughout most of its length may be replaced by the holddown shown in FIG. 6 which comprises a coiled spring at one end and a straight length of the spring wire throughout the length which will overlie the electrode strip. Alternatively, as shown in FIG. 7, the entire length of the holddown may consist of a strand 18b of conducting or non-conducting material such as rubber or any other elastomer. With a non-conducting holddown the anchoring wire 23 of FIG. 4 electrically connects the electrode strip 18 to 18a to the anchoring screw 21.

FIG. 6 also illustrates a modified wire end 19a formed in a U-shape and terminating in the connecting eyelet 19. The arm of the U adjacent the eyelet provides a finger grip which facilitates stretching the spring when placing the eyelet over the anchoring screw 21, and obviates the need for pliers or other attaching tool.

In FIG. 9 the supporting drum 4b is ungrooved, and a metal band with a V-groove 22b is disposed between a strip electrode 6a, like that of FIG. 5 and the drum surface. The strip electrode is yieldingly held in the groove 22b by the holddown 18 of FIGS. 1 to 5, or by those of FIGS. 6 and 7. The grooved band 26 preferably is secured at each end by the eccentric screws 20.

In FIG. 10 the drum 4c is very shallowly grooved. Seated in its groove is a composite band comprising a metal ribbon 27 and a V-grooved ribbon 28 of resilient foam material adhered to the metal ribbon. The strip electrode 6a is positioned in the groove by the same holddown 18 of FIGS. 1 to 10.

Shown in FIGS. 11 to 17 is a scanning assembly modified to hold an electrode strip 36 in a non-helical curve around a drum 34. With a non-helical disposition the pressure spot of the strip electrode 36 against the linear electrode 3 of FIG. 1 travels in non-linear relationship to elapsed time. Such non-linear scanning is useful, for example, in recording fathometers to compensate for non-linear propagation rates of sound in water of different depths and densities.

The drum 34 of FIG. 11 is like the drum 4 of FIG. 1 in having a truly helical groove 42. Two eccentric screws 40 are located at the end of the groove as shown and also at the end not shown. One register pin 41 is set in the groove, extending radially of the drum about the depth of the groove.

A flexible 0.005 inch thick stainless steel band 37 (FIGS. 12 and 14) similar to ribbon 27 of FIG. 10 is adaped to fit snugly in the drum groove. The band has keyholes 50 fitting over the eccentric screws 40, which are then turned to clamp the band to the drum. A register hole 51 snugly receives the register pin 41 precisely to position the band 37 lengthwise of the groove. Piercing the band are a series of slits 52 which are curved relative to the linear edges of the band. When the band is attached in helical shape to the drum the series of slits describes a non-helical curve around the drum. Extending in a curve parallel to the slits are a series of semi-circular spring fingers 53 struck upwardly at an angle of 45° to the band 37 and inclined toward the series of slits.

The modified strip electrode 36 (FIGS. 13 and 15) of 0.003 to 0.005 inch thick flexible stainless steel is folded with an upstanding panel 60 inclined at an angle of approximately 45° to a series of integral base tabs 62. Extending in the same plane away from each base tab 62 is a tongue 63 struck out of the strip. Intermediate the base tabs 62 are semi-circular spring fingers 64 folded at approximately 45° to the plane of the base tabs and inclined away from the upstanding panel 60. The endmost base tab 62 has a register hole 61 receiving the register pin 41.

Figure 17:
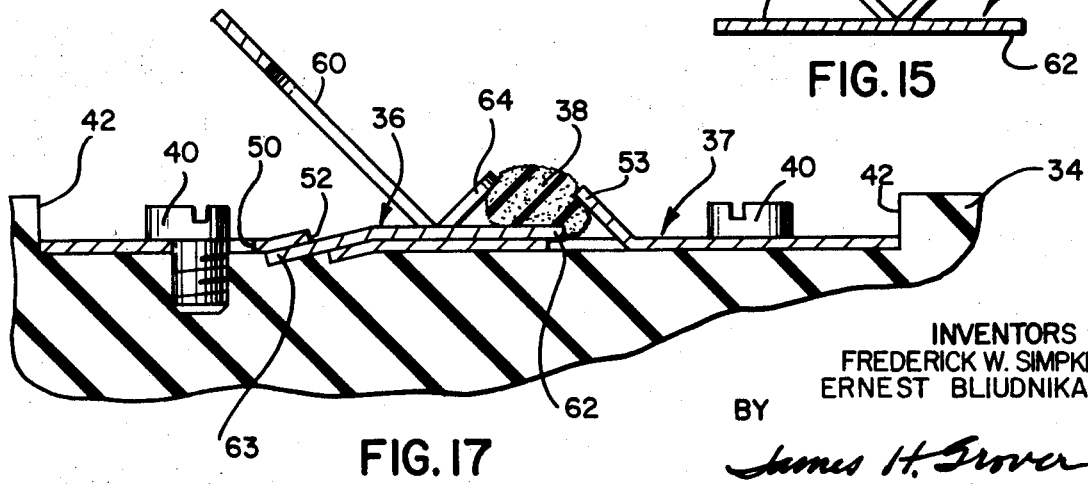
FIG. 17 is a section like FIGS. 14, of an assembly of the parts of FIGS. 11 to 16.

As shown in FIG. 17 the parts of FIGS. 11 to 16 are assembled by first attaching the band 37 in the drum groove 42 as previously described. The tongues 63 of the strip electrode 36 are then inserted in the corresponding slits 52 of the band 37. The longitudinal edges of the slits may be struck up and down to facilitate entry of the tongues as shown in exagerated proportion in FIG. 17. The endmost base tab 62 with the register hole 61 is fitted on the register pin 41. An elongate, rectangularly cross sectioned strip 38 of foam rubber or the like (FIG. 16) is then compressed between the tabs 53 on the band 37 and the opposed tabs 64 on the electrode strip 36. Lateral compression of the foam strip 38 between the tabs 53 and 64 forces sections of the upstanding electrode panel 60 against the opposed edges of the band slits 52 thereby positively conforming the curvature of the upstanding panel to the non-helical curve of the slit series. Also, because the inclined tabs 53 and 64 overlie the foam strip 38, vertical compression of the foam strip yieldingly urges the underlying base tabs 62 against the band 37. As previously similarly described with respect to FIGS. 1 to 4, the spring holddown action of the foam strip allows flexing of the upstanding panel 60 and base tabs 62, and also both lateral and longitudinal rocking of the strip electrode.

It should be understood that the present disclosure is for the purpose of illustration only and that this invention includes all modification and equivalents falling within the scope of the appended claims. Thus the strip electrode 6 need not be curved in a constant pitch helix, but may vary in pitch. While a completely cylindrical drum is shown, any support extending on a cylindrical surface may be used.

We claim:

1. A scanning assembly for facsimile recording comprising
    a cylindrical support,
    an elongate strip electrode folded lengthwise to form a base seating on the support and a portion upstanding at an oblique angle to the base so that pressure on the upstanding portion flexes the base relative to the support, the electrode being curved around the support,
    a substantially elastic elongate spring holddown means extending substantially the length of the strip and yieldingly bearing on the base to urge the strip toward the support and allow the base to flex away from the support, and
    means for attaching the strip and holddown to the support.

2. A scanning assembly according to claim 1 wherein said holddown comprises a coiled spring.

3. A scanning assembly according to claim 1 wherein said holddown comprises a strand overlying the strip electrode and elastic means between the strand and the support.

4. A scanning assembly according to claim 1 wherein said holddown comprises an elastomeric strand.

5. A scanning assembly according to claim 1 wherein said strip electrode is a longitudinally folded sheet and said holddown seats along the fold line of the sheet.

6. A scanning assembly according to claim 1 wherein said support has a groove curved therearound and said holddown yieldingly holds the strip electrode in the groove.

7. A scanning assembly according to claim 6 wherein the strip electrode is folded and the holddown positions at least one fold of the electrode in said groove.

8. A scanning assembly according to claim 1 wherein said groove is V-shaped to receive the fold of said strip electrode.

9. A scanning assembly according to claim 1 wherein said support has conductive anchoring means at one end thereof, and an electrical conductor between said strip electrode and said anchoring means.

10. A scanning assembly according to claim 9 wherein said holddown is non-conductive.

11. A scanning assembly according to claim 9 wherein said holddown is spring wire.

12. A scanning assembly according to claim 11 wherein said spring wire has an eyelet formed at its end.

13. A scanning assembly according to claim 12 wherein said spring wire has a U-form adjacent said eyelet.

14. A scanning assembly according to claim 12 wherein said cylindrical support has an eccentric-headed screw attached radially of the support for engagement by said eyelet.

15. A scanning assembly according to claim 1 wherein said holddown comprises the sole means holding the strip on the support.

16. A scanning assembly according to claim 1 characterized by a longitudinally grooved band between said strip and support, the groove of said band receiving said strip.

17. A scanning assembly according to claim 16 wherein said band comprises a strip of metal.

18. A scanning assembly according to claim 16 wherein said band comprises a ribbon of metal and a superimposed ribbon of resilient material having a longitudinal groove therein.

19. A scanning assembly according to claim 1 wherein the holddown means comprises means disposed non-linearly around the support for engaging the strip and holding it non-linearly curved.

20. A scanning assembly according to claim 19 wherein said strip engaging means comprises a linear band anchored on the support in helical form and including strip positioning means extending non-linearly along the band.

21. A scanning assembly according to claim 20 wherein said positioning means comprises a series of longitudinal slits, said strip having a corresponding series of tongues engaging in the slits.

22. A scanning assembly according to claim 21 wherein said band and strip have opposing portions adjacent said slits and tongues respectively positively positioning the strip on the non-linear curve of the slit series.

23. A scanning assembly according to claim 20 wherein said strip positioning means comprises a first series of fingers on the band overlying the strip.

24. A scanning assembly according to claim 23 wherein the strip has a second series of fingers overlying the strip.

25. A scanning assembly according to claim 24 wherein the fingers of the first and second series are resilient.

26. A scanning assembly according to claim 24 characterized by an elastic strip engaged under the first and second series of fingers and yieldingly bearing on the strip.

27. A scanning assembly according to claim 26 wherein said support and elastic strip have interengaging register means positioning the elastic strip longitudinally of the band.

28. A scanning assembly according to claim 27 wherein the band, electrode strip and elastic strip are separably attached to the support.

29. A scanning assembly according to claim 19 wherein the strip engaging means is separably attached to the support.

30. A scanning assembly according to claim 1 wherein the holddown is separably attached to the support.

* * * * *